United States Patent [19]

Sadoff, Jr. et al.

[11] 4,054,306
[45] Oct. 18, 1977

[54] TUBE AND CYLINDRICAL SURFACE SEALING APPARATUS

[75] Inventors: Bernard J. Sadoff, Jr., Rockville; Horace P. Halling, Laurel, both of Md.

[73] Assignee: Pressure Science Incorporated, Beltsville, Md.

[21] Appl. No.: 691,160

[22] Filed: May 28, 1976

[51] Int. Cl.$^2$ .............................................. F16L 21/00
[52] U.S. Cl. ................................. 285/233; 285/278; 285/286; 285/302; 285/305; 285/369; 285/424
[58] Field of Search ............... 285/223, 233, 305, 234, 285/278, 286, 187, 298, 302, 165, 261, 369, 424

[56] References Cited

U.S. PATENT DOCUMENTS

| | | | |
|---|---|---|---|
| 1,987,372 | 1/1935 | Schellhammer | 285/302 |
| 2,657,076 | 10/1953 | Hubbell | 285/223 X |
| 2,774,618 | 12/1956 | Alderson | 285/302 X |
| 2,781,205 | 2/1957 | Lane et al. | 285/165 X |
| 3,215,455 | 11/1965 | Fiala et al. | 285/233 |

Primary Examiner—Dave W. Arola
Attorney, Agent, or Firm—Roylance, Abrams, Berdo & Kaul

[57] ABSTRACT

A fluid-tight sealing apparatus for sealing a tube to a cylindrical surface while subjected to axial, rotational and angular misalignments comprising a metallic, resilient sealing member on the tube having a ring portion with a curved surface for contacting the cylindrical surface and for forming a fluid-tight seal by means of an interference fit therebetween. The cylindrical surface can be the interior surface of a bore with the sealing member including a frustoconical portion having the ring portion at the larger end thereof and fitting into the cylindrical bore. The cylindrical surface can be the exterior surface of a conduit with the sealing member including a frustoconical portion having the ring portion at the smaller end thereof and fitting around the cylindrical conduit.

19 Claims, 9 Drawing Figures

TUBE AND CYLINDRICAL SURFACE SEALING APPARATUS

The present invention relates to a fluid-tight sealing apparatus for sealing a tube to a cylindrical surface while the tube and cylindrical surface are subjected to axial, rotational and angular misalignments, and more particularly relates to an apparatus comprising a metallic, resilient sealing member on a tube having a ring portion with a curved surface for contacting the cylindrical surface and for forming a fluid-tight seal by means of an interference fit therebetween. Other specific applications of the sealing member set forth herein are disclosed in our concurrently filed applications entitled FLEXIBLE PIPING JOINT Ser. No. 691,159 PRESSURE COMPENSATED SLIDE JOINT Ser. No. 691,157.

Various piping systems having fluid under pressure flowing therethrough generally must be designed with means to provide for some degree of flexibility to allow for dimensional tolerances, thermal expansion and contraction, and vibrational deflections between the various components which are connected by the piping. Light weight compact means, which are particularly desirable in aircraft and missile systems, for providing such flexibility are known in the prior art; however, these prior art devices generally employ elastomeric, plastic, rubber or asbestos type seals to prevent leakage of the fluid flowing in the flexible system. Unfortunately, these type of seals tend to fail when exposed to high temperatures (above approximately 400° F.–500° F.), at very low temperatures, or in environments subjected to radiation.

Typically, sealing assemblies used in flexible piping systems in environments beyond the capability of seals made of elastomers and the like employ sections of piping with circumferential corrugations (i.e., bellows), expansion loops, or devices containing piston rings. However, these devices are generally very heavy, require large amounts of space, and are prone to failure and, therefore, leakage, due to fragility and wear. Moreover, these sealing systems often require exact tolerances and to manufacture and install.

Accordingly, it is an object of the present invention to provide a fluid-tight sealing apparatus which can be used at extreme temperatures and in environments subjected to radiation in which leakage is minimized when the apparatus is subjected to axial, rotational and angular misalignments and movements.

Another object is to provide a fluid-tight sealing apparatus which is lightweight, easy to make and install, and which can be reused.

Another object of the present invention is to provide a fluid-tight sealing apparatus which does not require exact tolerances or finely machined contacting surfaces.

The foregoing objects are attained by providing a fluid-tight sealing apparatus for sealing a tube to a cylindrical surface having a diameter of X, wherein the combination comprises a metallic, resilient sealing member on the tube comprising a ring portion having a curved surface for contacting the cylindrical surface, the curved surface having a free diameter prior to installation different from X to provide an interference fit between the curved surface and the cylindrical surface.

The cylindrical surface can be the interior surface of a bore with the sealing member including a frustoconical portion having the ring portion at the larger end thereof and fitting into the bore. In this instance, the free diameter of the curved surface prior to installation is greater than the interior diameter of the bore and, since the sealing member is resilient, the curved surface provides a spring loaded interference fit between itself and the bore.

In addition, the cylindrical surface can be the exterior surface of a conduit with the sealing member including a frustoconical portion having the ring portion at the smaller end thereof and fitting around the conduit. In this instance, the curved surface has a free diameter prior to installation which is less than the outer diameter of the conduit, thereby providing a spring loaded interference fit between the curved surface and the outer surface of the conduit.

While the radius of curvature of the ring portion curved surface, contacting the cylindrical surface, can be the same as the radius of the cylindrical surface, it has been found that a smaller radius can reduce the leakage rate of the sealing apparatus. That is, since leakage of fluid between two contacting surface is related to the contact stress, which is defined by the force tending to push these surfaces together divided by the area of contact, an increase in the contact stress reduces leakage. Thus, by making the radius of curvature of the curved surface on the ring portion smaller, the area of contact is reduced, thereby increasing the contact stress.

In addition, by decreasing the radius of the curved surface, exact tolerances and/or very high polish on the contacting surfaces is not necessary.

Moreover, since the sealing apparatus is formed of metal, it can exist under extreme temperatures and in environments subjected to radiation.

Since the frustoconical portion and the ring portion are made of very thin, high strength alloys, the sealing member is compact and light in weight.

Additionally, the differences in diameters of the tube and the cylindrical surface to be coupled is such that, while an interference fit is utilized, the dimensions and materials are chosen so that the elastic limit of the sealing member is not exceeded so that it will return to its initial size after the tube and the cylindrical surface are disconnected. Thus, the sealing member is reusable.

As used herein, the phrase "interference fit" means that with the sealing member curved surface having a slightly different free diameter prior to installation from the diameter of the cylindrical surface and with the curved surface being resilient, on forcing the curved surface into or around the cylindrical surface the sealing member will be elastically deformed and thus maintained in intimate circumferential contact with the cylindrical surface due to the reactive force of the elastic deformation.

As used herein, the phase "free diameter" means the diameter of the ring portion curved surface prior to installation with the cylindrical surface, and therefore prior to its elastic deformation, either compression or expansion.

Other objects, advantages and salient features of the present invention will become apparent from the following detailed description, which, taken in conjunction with the annexed drawings, discloses preferred embodiments of the present invention.

DRAWINGS

Referring now to the drawings which form a part of this original disclosure:

DETAILED DESCRIPTION OF THE INVENTION

Figure 1:
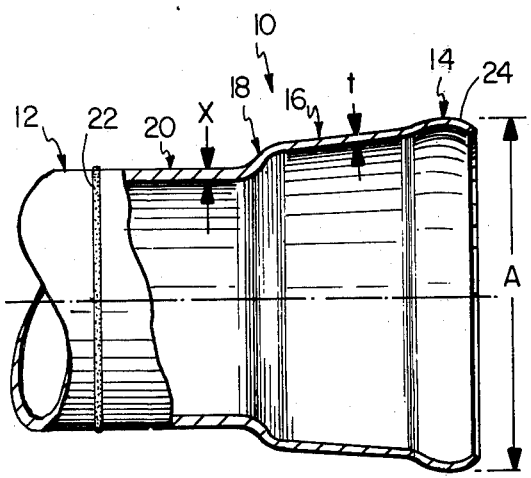
FIG. 1 is a side elevational view in longitudinal section of a tube having a fluid-tight sealing apparatus thereon in accordance with the present invention, the apparatus being in its elastically undeformed state.

Referring to the drawings in further detail, as shown in FIG. 1, the fluid-tight sealing apparatus in accordance with the present invention includes a sealing member 10 at the end of a tube 12, the sealing member comprising a ring portion 14, a frustoconical tapering portion 16, a frustoconical short portion 18 and a cylindrical portion 20. These elements comprising the sealing member 10 are integrally formed and, as shown in FIG. 1, the cylindrical portion 20, having the same outer diameter as the tube 12, is welded along weld line 22 to the end of the tube 12. The other end of the cylindrical portion 20 extends into the smaller end of the frustoconical short portion 18 which has its larger end extending into the smaller end of the frustoconical tapering portion 16. The larger end of the tapering portion 16 extends into the ring portion 14 which is at the end of the sealing member 10. The tapering portion 16 is located on one side of the plane containing the end of the tapering portion from which the ring portion 14 extends, and the ring portion 14 is located on the other side of this plane.

The thickness $x$ of the cylindrical wall forming the cylindrical portion 20 can be the same or different from the thickness of the cylindrical wall forming the tube 12. As seen in FIG. 1, the thickness of the wall forming the sealing member 10 decreases along the frustoconical short portion 18 from a thickness $x$ to a thickness $t$ which continues substantially the same along the wall forming the frustoconical tapering portion 16 and the ring portion 14. Thus, the ring portion and the tapering portion have substantially equal longitudinal cross-sectional thicknesses. This reduction in thickness enhances the resiliency of the sealing member 10. The thickness can be from 0.003 to 0.020 inch in the range of tube diameters from 0.125 to 15.00 inches with the material forming the sealing member 10 comprising a high strength alloy such as Inconel 718 or Waspalloy which has excellent spring properties at extreme temperatures.

The ring portion 14 has an outer curved surface 24 and is arcuate in longitudinal cross-section. The exterior free diameter of the ring portion curved surface 24 is shown in FIG. 1 as A which is greater than the diameter X of the cylindrical bore shown in FIG. 2. Sealing is accomplished by the intimate spring loaded contact of the curved surface 24 and the bore surface 26 which is a circumferential contact line at the seal interface 30.

Referring again to FIG. 1, the ring portion 14 curved surface 24 is exterior to the frustoconical plane containing the outer surface of the frustoconical tapering portion 16 and, therefore, has a diameter A greater than the maximum diameter of the frustoconical elongated portion.

Figure 2:
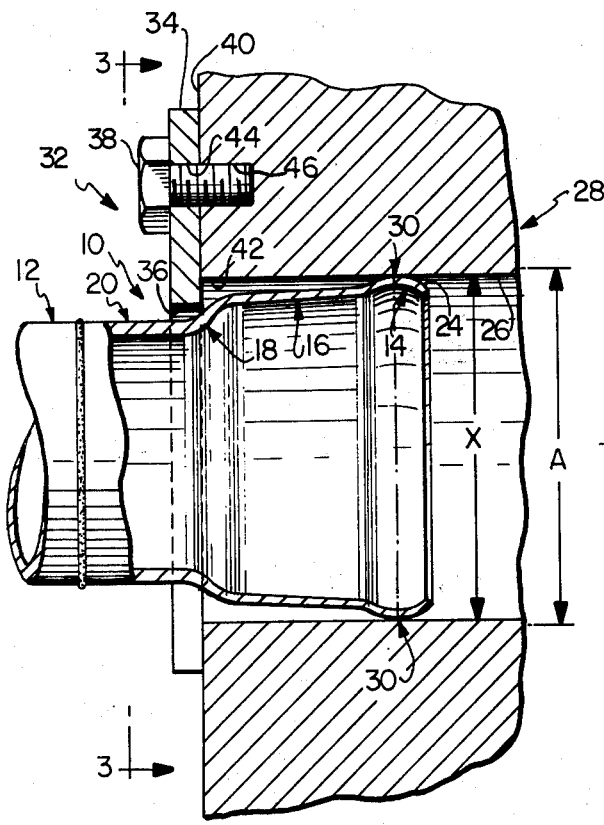
FIG. 2 is a side elevational view in longitudinal section of the tube shown in FIG. 1 in its elastically deformed state in which it has been installed in the cylindrical bore of a body, such bore having a diameter of X which is less than the free diameter A of the apparatus shown in FIG. 1.

Referring now to FIG. 2, the tube 12 with the sealing member 10 thereon is shown fitted, or installed into the cylindrical bore 26 in the body 28, such body being a port on a valve, actuator or similar component formed of metal or ceramic material and tube 12 being a pipe or conduit having fluid under pressure flowing therethrough and into or out of the body 28. The fit of the sealing member 10 with the cylindrical bore 26 is an interference fit as defined above insofar as the maximum free diameter A of the curved surface 24 is greater than the inner diameter X of the cylindrical bore 26 and the sealing member 10 has been forced into the cylindrical bore, remaining there by means of the outwardly directed spring force of the resilient ring portion 14 and the resilient tapering portion 16.

As shown in FIG. 2, the curved surface 24 contacts the inner surface of the cylindrical bore 26 along seal interface 30. This seal interface extends circumferentially around the curved surface 24 where it continuously contacts the inner surface of the cylindrical bore 26, thereby providing the seal between these two elements.

The interference fit must be relatively light to enable the user to insert or remove the sealing member 10 by normal hand pressure and to insure that the resilient sealing element is not stressed beyond its elastic limit. This relatively light fit, which keeps friction forces low, permits relative sliding and rotation of the sealing member 10 and bore 26 while in sealing contact. Although the interference fit is relatively light, good sealing characteristics are present since pressure of the fluid in the tube and the bore tends to force the sealing member outwardly into its sealing contact, thereby making the seal "pressure energized." With a cylindrical bore diameter X of 0.420 to 0.422 inch, a free diameter A of the curved surface 24 of 0.424 to 0.425 inch (i.e., the interference fit is 0.002–0.005 inch) has been found advantageous for a seal of this diameter (0.421). Two inch diameter seals work well with a 0.003 to 0.007 inch interference fit.

The contained pressure in the tube being sealed would, in most applications greater than pressures of about 1 psi, be sufficient to blow the sealing member 10 out of the bore 26.

Figure 3:
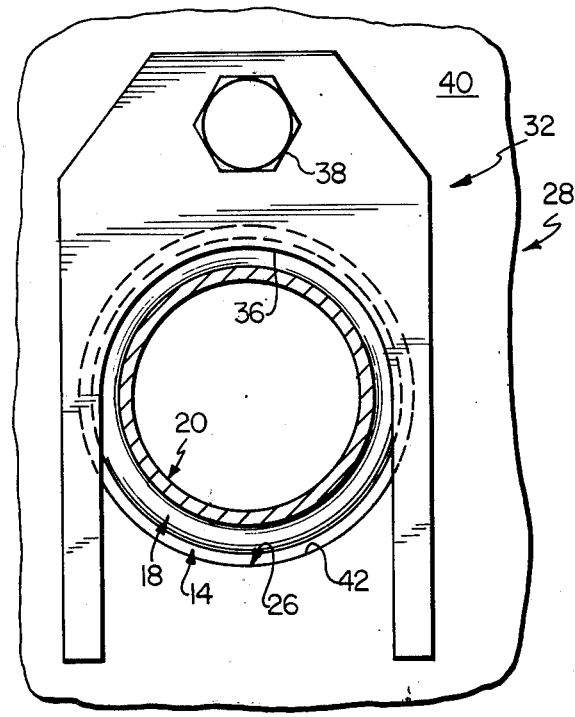
FIG. 3 is an end elevational view in section taken along lines 3—3 in FIG. 2 showing a keeper assembly which prevents the sealing member from exiting from the cylindrical bore in the body shown in FIG. 2.

Consequently, a keeper assembly 32, shown in FIGS. 2, 3, 4, and 5, is utilized to prevent the sealing member 10 from exiting the cylindrical bore 26. As best seen in FIGS. 2 and 3, this keeper assembly 32 comprises a main member 34 having a cutout 36 therein, the main member 34 being coupled to the surface 40 of the body 26 adjacent the entrance 42 of the cylindrical bore 26 by means of a bolt 38 passing through an aperture 44 therein and being received in threaded bore 46 in the surface 40 of body 28.

The keeper assembly 32 is coupled to the body 28 after the sealing member 10 has been maneuvered into the cylindrical bore 26 by maneuvering the cutout 36 over the cylindrical portion 20 and passing bolt 38 through aperture 44 into threaded bore 46.

As shown best in FIGS. 2 and 3, the maximum dimension of the cutout 36 is less than the maximum diameter of the frustoconical short portion 18 so that, when the tube 12 experiences a force tending to pull it axially out of the cylindrical bore, the main member 34 around the cutout 36 prevents such axial exiting by contacting the frustoconical short portion 18.

Figure 5:
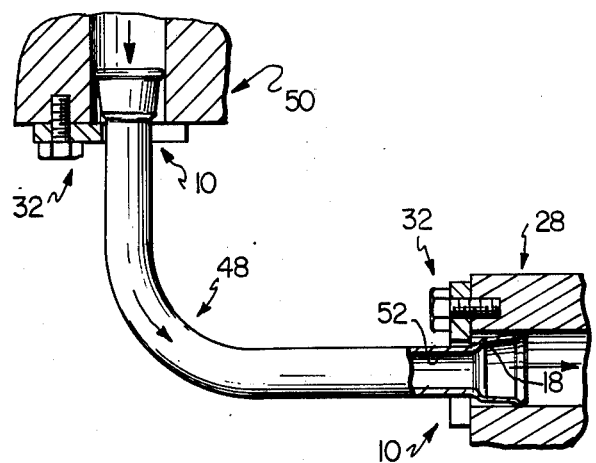
FIG. 5 is a side elevational view in partial section showing a tube having a fluid-tight sealing apparatus at both ends, these two ends being received in two bodies having cylindrical bores therein and maintained in that position by means of keeper assemblies.

Referring now to FIG. 5, a curved tube 48 is shown having a sealing member 10 in accordance with the present invention on opposite ends thereof with these members 10 being received respectively in a body 28 and a body 50. Since the pressure of the fluid flowing through curved tube 48, as indicated by the arrows, would possibly tend to pull the curved tube 48 from bodies 28 and 50, two keeper assemblies 32 are utilized on these bodies. As shown therein, the sealing members 10 are integrally formed with the curved tube 48 so that the cylindrical portion 52 adjacent to the frustoconical short portion 18 is integral with the tube and therefore need not be welded thereto.

Figure 6:
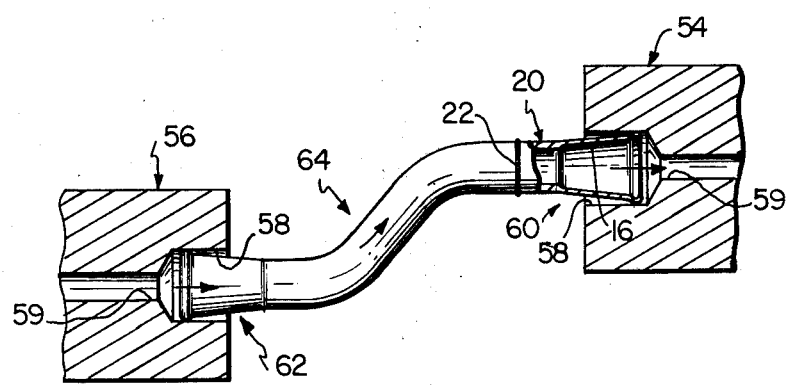
FIG. 6 is a side elevational view in partial section of a tube having two fluid-tight sealing apparatus at opposite ends, these ends being received in two bodies having cylindrical bores therein, but the use of the keeper assemblies, being unnecessary, is eliminated.

Referring now to FIG. 6, bodies 54 and 56 are shown having cylindrical bores 58 receiving sealing members 60 and 62 at opposite ends of a tube 64. Each of the cylindrical bores terminates in a reduced diameter bore 59, each of which is adjacent to an end of tube 64. In this instance, with bodies 54 and 56 being rigidly supported against relative movement and with the flow of the fluid through tube 64 being shown by the arrows, there is no necessity for the keeper assemblies since there is no tendency for tube 64 to be axially displaced from the cylindrical bores 58 since on slight axial displacement one end of tube 64 strikes the face of bore 49 before the outer end exits from the other body. With the removal of the necessity of the keeper assemblies, sealing members 60 and 62 need not have the frustoconical short portion 18 interposed between the cylindrical portion 20 and the frustoconical tapering portion 16, which is thereby eliminated.

As seen on the right hand side of FIG. 6, sealing member 60 has its cylindrical portion 20 welded along weld line 22 to the tube 64, while as seen on the left hand side of FIG. 6, the sealing member 62 is integrally formed with tube 64, thereby eliminating the necessity of a weld line.

Figure 4:
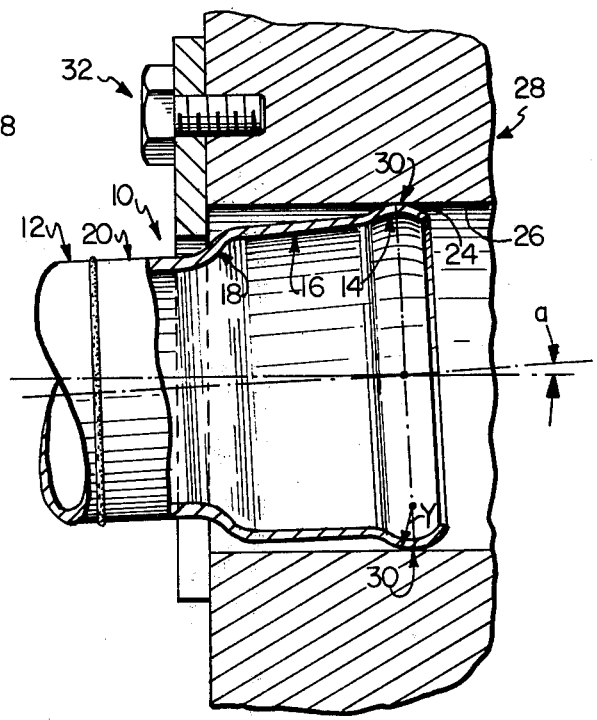
FIG. 4 is a side elevational view in longitudinal section similar to FIG. 2 except with the tube angularly misaligned relative to the center line of the cylindrical bore in the body.

In practice, because of tolerances and deflections of the components being connected, such as bodies 54 and 56 in FIG. 6, sealing member 10 will not be in perfect alignment with cylindrical bore 26 as shown in FIG. 2, but will be misaligned by same angle a as shown in FIG. 4. In general the tolerance and deflections are such as to require angle a to be less than 6° and most all applications are covered by angle a being less than 12°.

As shown in FIG. 4, the radius of curvature Y of the curved surface 24 is less than the radius of the cylindrical bore 26, i.e., less than X/2, which increases the contact stress between surface 24 and bore 26, thereby decreasing the leakage rate of the contained fluid. It has been found that the radius of curvature Y can be reduced to about 20% of the radius of the bore 26 and still maintain a "bubble tight" seal with Nitrogen at 500 psi for angles of misalignment as great as 5° with a 0.3125 diameter tube. A "bubble tight" seal is one which has a leakage rate of $10^{-3}$ cc./sec. of Helium.

The high contact stress resulting from the reduced radius of curvature gives excellent leakage control at relatively small values of angles a, but if larger angles are required then the radius of curvature can be increased to meet such requirements, although a slight loss in leakage control may be experienced at small angles. Thus, on a 2.25 inch diameter seal, the angulating capability of the sealing element can be increased from an angle $a=3°$ to $a=5°$ by changing the radius of curvature of the outer surface from 0.125 to 0.250 inch.

While the circumferential seal interface 30 in FIG. 2 would be substantially a circular line with curved surface 24 and bore 26 having coinciding center lines, the seal interface becomes substantially an elliptical line with the tube 12 and bore 26 having their center lines misaligned as shown in FIG. 4.

Thus, the sealing member 10 provides a viable seal with bore 26 during relative axial, sliding movement therebetween, relative angular misalignment therebetween, and relative rotation therebetween.

EMBODIMENTS OF FIGS. 7 AND 8

Figure 7:
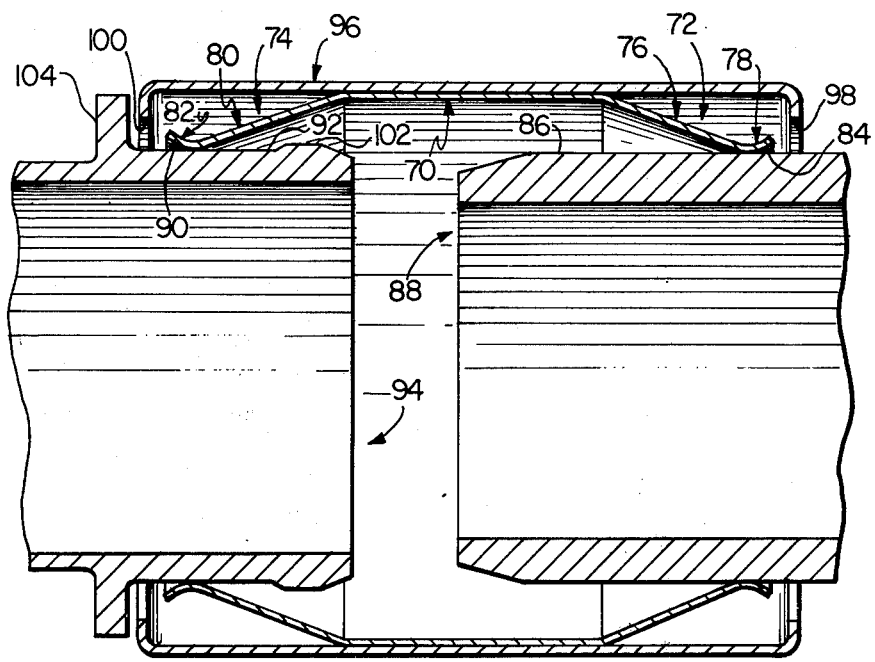
FIG. 7 is a side elevational view in longitudinal section of a second embodiment of the present invention in which the cylindrical surface is the exterior surface of a cylindrical conduit and the sealing member fits around the cylindrical conduit.
Figure 8:
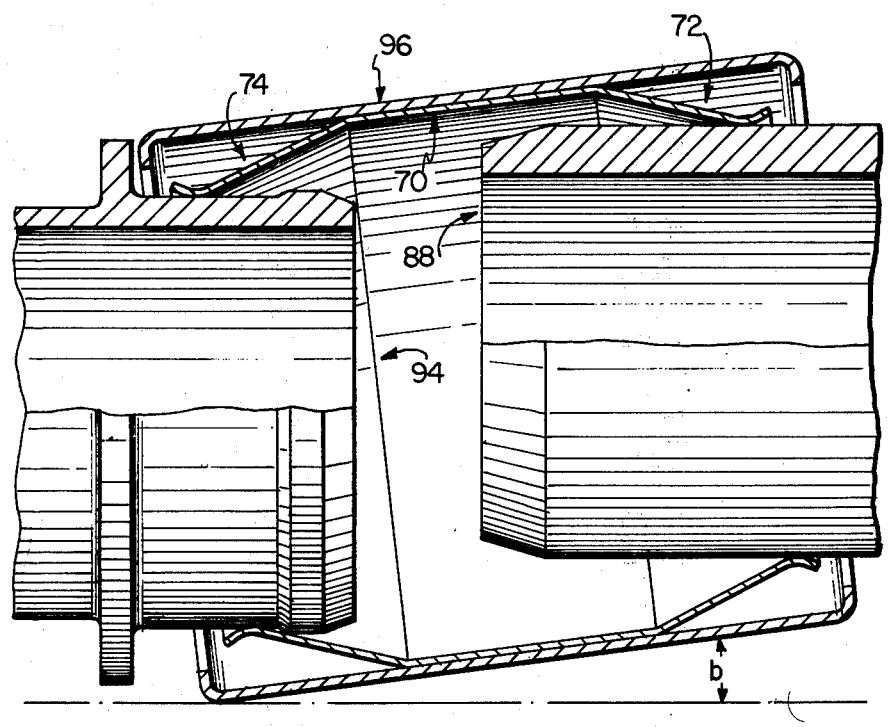
FIG. 8 is a side elevational view in longitudinal section showing the assembly of FIG. 7 in which the two conduits shown therein are misaligned.

FIGS. 7 and 8 discloses an alternate embodiment utilizing the basic concept disclosed in FIGS. 1–6 hereof. Thus, in the embodiment of FIGS. 7 and 8 the cylindrical surface is the exterior cylindrical surface of a cylindrical conduit and the sealing member includes a frustoconical portion having a ring portion at the smaller end thereof with the ring portion fitting around the outside surface of the cylindrical conduit. In this instance, the minimum free diameter of the curved surface on the ring portion is less than the outer diameter of the cylindrical conduit, thereby providing the interference fit.

Referring specifically to FIG. 7, a tube 70 has a first sealing member 72 at one end and a second sealing member 74 at the other end, both of these sealing members being integrally formed with the tube 70. The first sealing member 72 comprises a frustoconical tapering portion 76 and a ring portion 78 extending from the smaller end of the frustoconical tapering portion 76. The larger end of the tapering portion 76 extends from the end of tube 70.

Similarly, the second sealing member 74 is comprised of a second frustoconical tapering portion 80 and a second ring portion 82 extending from the smaller end of the second tapering portion 80. The larger end of the second tapering portion extends from the end of the tube opposite the tapering portion 76.

Ring portion 78 has a curved surface 84 contacting and in an interference fit with the outer cylindrical surface 86 of a first cylindrical conduit 88 which has fluid under pressure flowing therethrough and which is secured to a rigid structure, not shown.

Similarly, the second ring portion 82 has a curved surface 90 contacting and in an interference fit with the outer cylindrical surface 92 of a second cylindrical conduit 94, which has fluid under pressure flowing therethrough and which is secured to a rigid structure, not shown.

The sealing operation of the curved surfaces relative to the outer cylindrical surfaces of the conduits is the same as that discussed above regarding FIGS. 1–6, and therefore will not be discussed in detail. However, it is apparent from FIG. 7 that fluid flowing between conduits 88 and 94 will be prevented from leaking out of the closed system formed by tube 70 and sealing members 72 and 74 by means of the seal formed respectively between curved surfaces 84 and 90 and the outer cylindrical surfaces 86 and 92 of the conduits.

As shown in FIG. 7, a cylindrical canister 96, having an inside diameter equal to the outer diameter of tube 70, is welded to the tube 70 along their contacting margins and, since the canister 96 is of thicker material than tube 70, provides protection from vibrational forces to the tube 70 and its thin sealing members 72 and 74.

As seen in FIG. 7, canister 96 has a first open end 98 extending past sealing member 72 and receives therein one end of conduit 88 with the diameter of the first open end 98 being larger than the outer diameter of the conduit 88.

Similarly, the second open end 100 of the canister 96 extends past the end of the second sealing member 74 and receives the end of the second cylindrical conduit 94, with the diameter of the second open end 100 being larger than the outer diameter of the second cylindrical conduit 94.

The second cylindrical conduit 94 has, adjacent the end thereof, a first annular portion 102 raised slightly above the cylindrical surface 92 and has in addition a second annular portion 104 extending from the cylindrical surface 92, this second annular portion being located to the left of the second open end 100 of canister 96, as shown in FIG. 7. By forming these first and second annular portions on the cylindrical surface 92 unwanted disengagement of the tube 70 and canister 94 due to various vibrational forces encountered by the conduits 88 and 94 is prevented. While these annular portions 102 and 104 are shown only on conduit 94, they could also be provided on conduit 88 as well.

Referring now to FIG. 8, the apparatus shown in FIG. 7 is repeated except that the conduits 88 and 94 are misaligned with regard to their center lines due to dimensional tolerances or due to vibrational or other mechanical forces to which the conduits 88 and 94 are subjected. It has been found that a misalignment angle shown as b in FIG. 8 to the extent of about 5° can be tolerated by the sealing apparatus of the present invention and leakage will occur at a very low rate. The interference fit between the curved surface 84 and the cylindrical surface 86 and the curved surface 90 and the cylindrical surface 92 maintains the necessary contact between these parts to maintain the seal during misalignment.

EMBODIMENT OF FIG. 9

Figure 9:
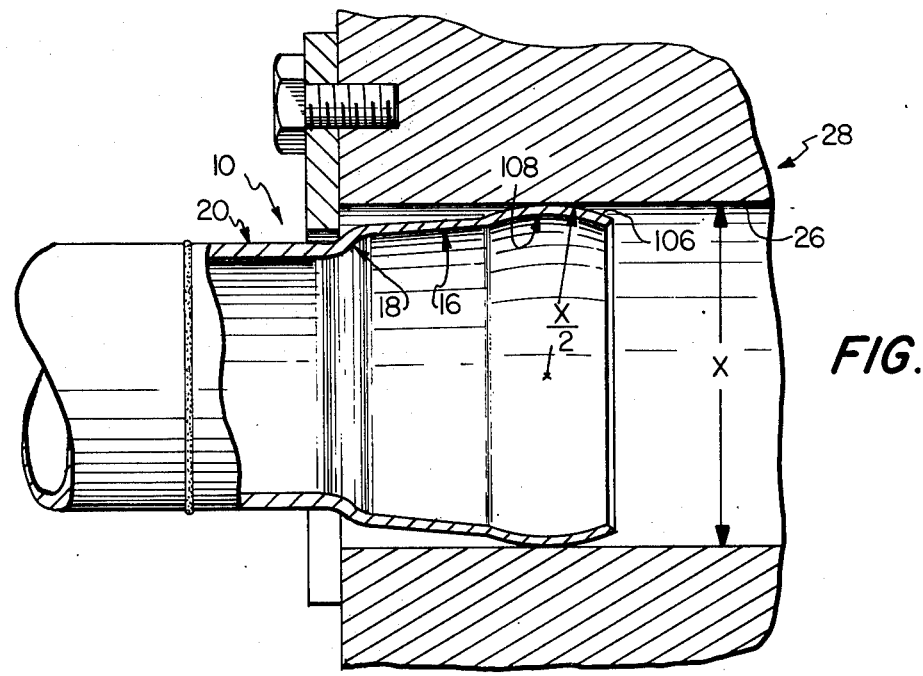
FIG. 9 is the same as FIG. 2 except the ring portion curved surface has a radius of curvature equal to X/2.

The embodiment of the fluid-tight sealing apparatus in accordance with the present invention shown in FIG. 9 is the same as that shown in FIG. 2 except the curved surface 106 of the ring portion 108 has a radius of curvature equal to the radius of the cylindrical bore 26. Thus, the curved surface has a radius of curvature equal to X/2 as shown in FIG. 9.

While the contact stress of the seal interface between the curved surface 106 and the surface of the cylindrical bore 26 is less than the contact stress of the FIG. 2 embodiment, since the area of contact is greater, this embodiment can maintain a contacting seal interface over a wider range of angular misalignment than the FIG. 2 embodiment.

While various embodiments have been chosen to illustrate the invention, it will be understood by those skilled in the art that various changes and modifications can be made therein without departing from the scope of the invention as defined in the appended claims.

What is claimed is:

1. A fluid-tight sealing apparatus for sealing a tube inserted into a cylindrical surface having an inner diameter of X wherein the tube and the cylindrical surface are subject to relative angular misalignment, axial movement and rotation, the combination comprising:

a metallic, resilient sealing member extending, at the end of the tube, axially of the tube in the direction of insertion of the tube into the cylindrical surface, said sealing member comprising a ring portion having a curved surface for contacting the cylindrical surface, and a tapering portion, said tapering portion extending axially and expanding radially in the direction of insertion of the tube into the cylindrical surface, said ring portion extending axially away from the larger end of said tapering portion in the direction of insertion of the tube into the cylindrical surface, said ring portion and said tapering portion being formed from a single piece of material, said ring portion curved surface having a free diameter larger than X to provide an interference fit between said curved surface and the cylindrical surface, thereby forming a fluid-tight seal therebetween.

2. An apparatus according to claim 1, wherein said tapering portion is frustoconical.

3. An apparatus according to claim 1, wherein said ring portion and said tapering portion have substantially equal longitudinal cross-sectional thicknesses.

4. An apparatus according to claim 1, wherein said ring portion is arcuate in longitudinal cross-section.

5. An apparatus according to claim 1, wherein said ring portion curved surface has a radius of curvature less than X/2.

6. An apparatus according to claim 1, wherein said ring portion curved surface has a radius of curvature equal to X/2.

7. An apparatus according to claim 3, wherein said sealing member further comprises a frustoconical short portion extending from the end of said frustoconical tapering portion opposite from said ring portion, and a cylindrical portion extending from said short portion.

8. An apparatus according to claim 7, wherein said cylindrical portion is integral with the tube.

9. An apparatus according to claim 7, wherein said cylindrical portion is welded to the tube.

10. An apparatus according to claim 7, wherein said body having said bore formed therein has means, coupled to the outer surface thereof adjacent the entrance of said bore, for preventing the said sealing element from exiting from said bore.

11. An apparatus according to claim 10, wherein said means comprises a member having an arcuate cutout therein at least partially receiving said cylindrical portion, said arcuate cutout having a maximum dimension smaller than the larger diameter of said frustoconical short portion.

12. An apparatus according to claim 3, wherein said sealing member further comprises a cylindrical portion extending from the end of said frustoconical tapering portion opposite from said ring portion.

13. An apparatus according to claim 12, wherein said cylindrical portion is integral with the tube.

14. An apparatus according to claim 12, wherein said cylindrical portion is welded to the tube.

15. A fluid-tight sealing apparatus for sealing a tube receiving a cylindrical conduit having an outer diameter of X wherein the tube and the conduit are subject to relative angular misalignment, axial movement and rotation, the combination comprising:
a metallic resilient sealing member extending axially outward of the tube from an end of the tube,
said sealing member comprising a ring portion having a curved surface for contacting the outer surface of the cylindrical conduit, and a frustoconical tapering portion,
said tapering portion having the larger end thereof coupled to said end of the tube and having the smaller end thereof coupled to said ring portion,
said ring portion and said tapering portion being formed from a single piece of material,
said tapering portion extending axially outward of the tube from said end of the tube,
said ring portion extending axially outward from the smaller end of said tapering portion,
said ring portion curved surface having a free diameter smaller than X to provide an interference fit between said outer surface of the cylindrical conduit and said curved surface, thereby forming a fluid-tight seal therebetween.

16. An apparatus according to claim 15, and further comprising
a second metallic, resilient sealing member on the opposite end of the tube,
said second sealing member comprising a second frustoconical tapering portion and a second ring portion extending from the smaller end of said second frustoconical tapering portion,
said second ring portion having a second curved surface for contacting the exterior cylindrical surface of a second cylindrical conduit,
said second curved surface having a minimum free diameter less than the outer diameter of said second conduit to provide an interference fit therebetween.

17. An apparatus according to claim 16, wherein said tube is coupled on its exterior surface to an open-ended cylindrical canister having opposite ends extending respectively past said ring portion and said second ring portion, and receiving respectively the ends of said conduit and said second conduit.

18. An apparatus according to claim 17, wherein at least one of said conduit and said second conduit has thereon means for preventing disengagement of said cylindrical canister therefrom.

19. A fluid-tight sealing apparatus for sealing a tube to a cylindrical surface having a diameter of X wherein the tube and the cylindrical surface are subject to relative angular misalignment, axial movement and rotation, the combination comprising:
a metallic, resilient sealing member extending axially of the tube at the end of the tube,
said sealing member comprising a ring portion having a curved surface for contacting the cylindrical surface, and a tapering portion,
said ring portion extending axially away from an end of said tapering portion,
said tapering portion being located on one side of the plane containing the end of the tapering portion from which the ring portion extends and said ring portion being located on the other side of said plane,
said ring portion and said tapering portion being formed from a single piece of material,
said ring portion curved surface having a free diameter different from X to provide an interference fit between said curved surface and the cylindrical surface, thereby forming a fluid-tight seal therebetween.

* * * * *

UNITED STATES PATENT OFFICE
CERTIFICATE OF CORRECTION

PATENT NO. : 4,054,306
DATED : October 18, 1977
INVENTOR(S) : Bernard J. Sadoff, Jr. and Horace P. Halling It is certified that error appears in the above-identified patent and that said Letters Patent are hereby corrected as shown below:

In claim 12, line 1, change "3" to --2--.

Signed and Sealed this

Twenty-first Day of February 1978

[SEAL]

Attest:

RUTH C. MASON
*Attesting Officer*

LUTRELLE F. PARKER
*Acting Commissioner of Patents and Trademarks*